United States Patent [19]

Blanding

[11] Patent Number: 5,301,042
[45] Date of Patent: Apr. 5, 1994

[54] IMAGING PLATFORM SUPPORT TO PERMIT DITHERING MOTION

[75] Inventor: Douglass L. Blanding, Rochester, N.Y.

[73] Assignee: Eastman Kodak Company, Rochester, N.Y.

[21] Appl. No.: 354

[22] Filed: Jan. 4, 1993

[51] Int. Cl.$^5$ .................. H01J 5/02; H04N 3/12; H04N 3/14
[52] U.S. Cl. ........................... 358/474; 250/239; 358/483; 348/294; 348/374
[58] Field of Search .................. 250/239, 208.1; 358/474, 482, 483, 209, 212, 213.11, 213.22, 213.28

[56] References Cited

U.S. PATENT DOCUMENTS

| | | | |
|---|---|---|---|
| 4,607,287 | 8/1986 | Endo et al. | 358/213.28 |
| 4,638,371 | 1/1987 | Milch | 358/293 |
| 5,182,652 | 1/1993 | Stephenson, III | 358/486 |

Primary Examiner—Edward L. Coles, Sr.
Assistant Examiner—Kimberly A. Williams
Attorney, Agent, or Firm—Robert L. Randall

[57] ABSTRACT

This invention shows a mounting for an image sensor in an optical path wherein the axis of the path is perpendicular to the surface of the image sensor so that every pixel on the image sensor is rigidly positioned with respect to the direction of the optical path but is free to undergo small dithering movement transverse to the direction of the optical path. The mounting comprises a platform (64) to which the image sensor is mounted, and at least three wire legs (84) having sufficient rigidity that they support the image sensor without stretching or buckling, each wire leg being attached to the platform at one end and attached to a base plate at the other end. The wire legs are disposed substantially parallel to the optical path so that the platform and the image sensor are movable transversely of the optical path upon the application of a transverse force to the platform without movement along the direction of the optical path.

1 Claim, 2 Drawing Sheets

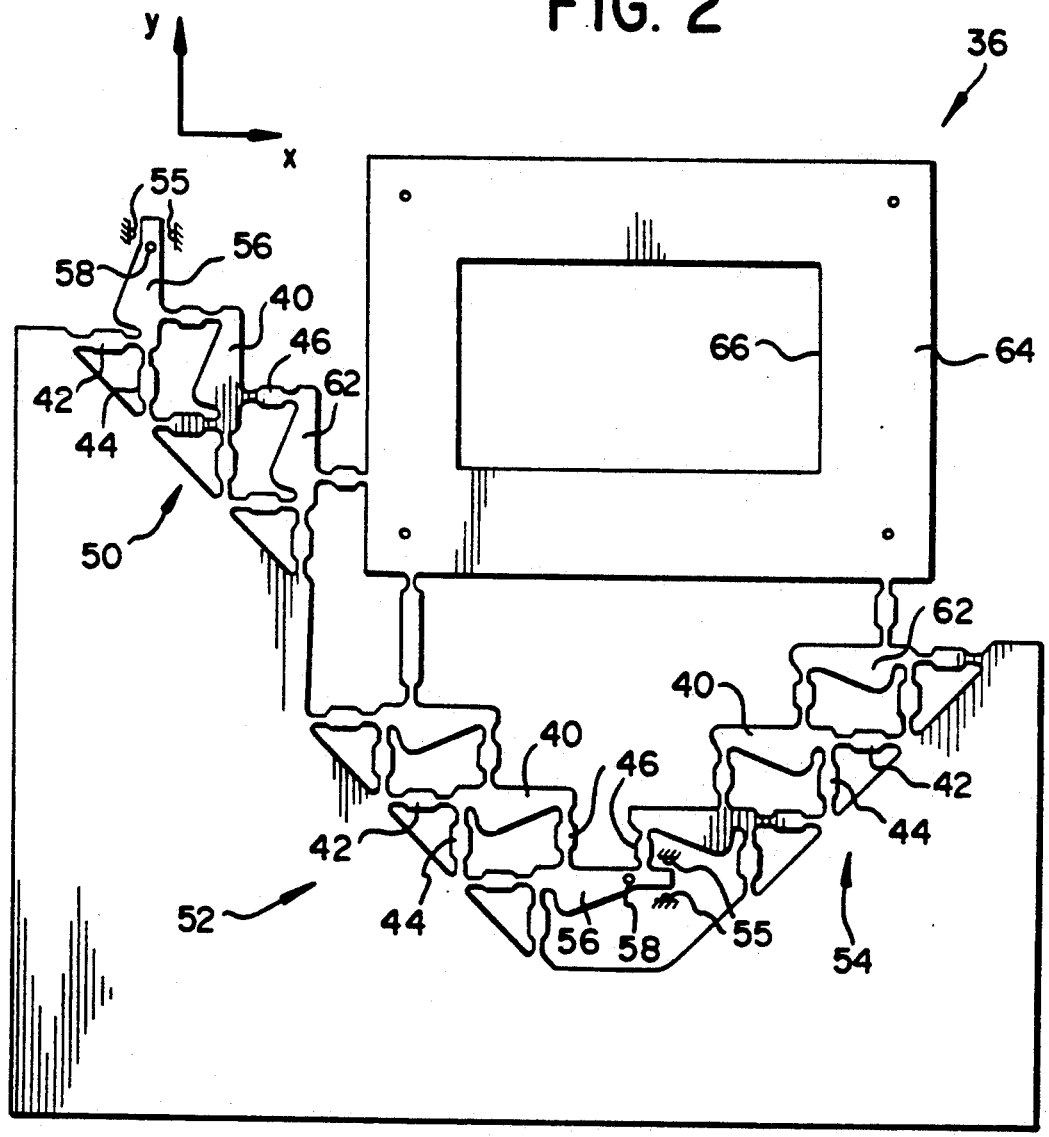

IMAGING PLATFORM SUPPORT TO PERMIT DITHERING MOTION

FIELD OF THE INVENTION

This invention relates generally to an imaging system and, more particularly, to an apparatus for generating a high resolution image from an image sensor by dithering either the image sensor or the image source to generate an image having a resolution higher than the resolution of the image sensor, and more particularly, to a specific platform support to permit a dithering movement of the image sensor.

BACKGROUND OF THE INVENTION

In some conventional imagers, transparent images are sequentially scanned by projecting light through, or reflecting light from, the image and onto an image sensor, such as a CCD imaging array. The signal from the CCD array is conditioned so that an electronic output is generated from the scanned image. The input image may consist of a typical 35 mm slide or other forms of photographic sources. The CCD array typically consists of pixels disposed in rows and columns and producing an output formed as an array conforming to a standard format, for example, as video signals in the NTSC standard format or the PAL standard format. The array responds to the light from the light that is projected through or reflected from the image source that is focused onto the imager. The resulting electronic signal may be stored for future use or it may be employed to generate a new image.

One problem with prior art methods used to generate images is that the resolution has been limited by the resolution capable from the available image sensors, such as CCD arrays. Typically, a photographic image has several times the resolution of a CCD imager. What is actually on the original image may not be exactly what is seen by the CCD since it only registers image data up to the ability of its resolution. Another problem is that only a small fraction of the area of a CCD array is actually photoactive, i. e. the array is "sparse". To get a more accurate reproduction and thereby greater resolution, the CCD has to "see more".

One method of providing the CCD with the ability to "see more" is disclosed in U.S. Pat. No. 4,638,371, entitled Multiple Exposure of Area Image Sensor Having A Sparse Array of Elements, which teaches that each sensor element is multiply exposed by different pixels of an image. The input image is scanned in such a pattern between element exposures that each digital image pixel has a nearest neighbor digital image pixel that was produced by a different sensor element. By this arrangement, a high quality image can be produced from the digital image even if a sensor becomes defective. A dithered sensor is disclosed that has a plurality of positions so as to create a sub-image. The system disclosed, however, does not disclose a simple, economic, and reliable mechanism for dithering the sensor or the input image. Dithering is the mechanical movement of the sensor or the input image in a predetermined pattern to change the image pixel elements that are sensed by the individual elements in an array of scanning elements.

Solid state image sensors generally have a linear or area organization. An area image sensor offers the advantage of increased integration time for each element. In some applications, a large number of image pixels have to be digitized. For example, to make a high quality color print of a photographic image, something on the order of about two million image pixels must be digitized for each color (red, green and blue) of input image to produce a high quality output signal. With existing technology, typical CCD area image sensors have about 300,000 elements. Thus, each element of an area image sensor must sample a plurality of image pixels. Thus, dithering is a technique to create an image of higher resolution than that which would ordinarily be produced with the sensor's normal capability. Such dithering movement must assure that the image sensor remains precisely located along the optic path so that the image is accurately focused. Thus, it will be appreciated that a simple, economic, and reliable imaging platform support that permits dithering movement of the sensor or the input image must be provided.

SUMMARY OF THE INVENTION

According to the present invention a means for mounting an image sensor in an optical path is provided wherein the axis of the path is perpendicular to the surface of the image sensor so that every pixel on the image sensor is rigidly positioned with respect to the direction of the optical path but is free to undergo small displacements transverse to the direction of the optical path. The mounting means comprises a platform to which the image sensor is mounted, and at least three wire legs having sufficient rigidity that they support the image sensor without stretching or buckling, each wire leg being attached to the platform at one end and attached to a base plate at the other end. The wire legs are disposed substantially parallel to the optical path whereby the platform and the image sensor are movable transversely of the optical path upon the application of a transverse force to the platform without movement along the direction of the optical path. The wires bend slightly in order to permit this transverse movement.

Various means for practicing the invention and other features and advantages thereof will be apparent from the following detailed description of an illustrative, preferred embodiment, reference being made to the accompanying drawings.

BRIEF DESCRIPTION OF THE DRAWINGS

FIG. 2 is a plan view of an arrangement of cascaded levers for dithering an image sensor support platform.

DESCRIPTION OF THE PREFERRED EMBODIMENT

Figure 1:
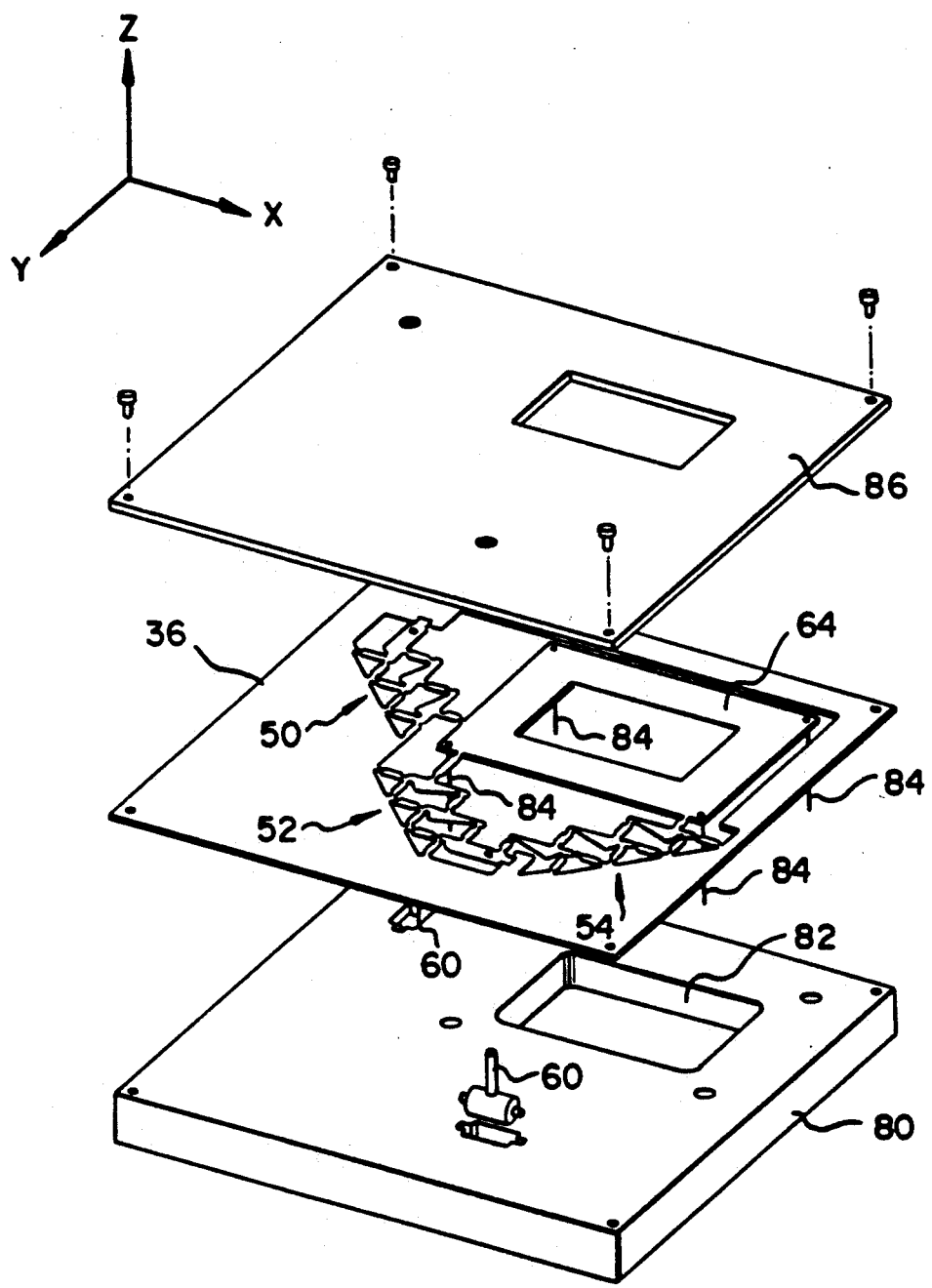
FIG. 1 is an exploded perspective view of an image dithering assembly employing the imaging platform support of the present invention.

For the purpose of increasing the resolution of an image being acquired by an area type image sensor, such as a CCD array, it has been found that it is useful to do four successive "scans" with the CCD array repositioned relative to the image by a fraction of the pixel dimensions of the array; to the left and to the right of the nominal position, and to the top and to the bottom relative to the nominal position. This is called "dithering". The present invention relates to a means for causing an image sensor, such as a CCD array, to be repositioned by a small amount, typically a movement on the order of 4 microns, repeatably and reliably.

Referring now to the drawings, FIG. 1 shows three sets of cascaded levers 50, 52 and 54 as they are used in the present invention. In this illustration the levers are cascaded to convert a small motion to an extremely small motion. Each of the levers is provided with a fulcrum and the first lever is provided with an input force. The last lever is arranged to output a small amount of movement to a platform 64. As illustrated, the levers are "cascaded" so that for a given movement at the input point, the output will move only a small fraction thereof. Thus, when the first lever is moved a small amount, i.e. the distance between the stops, the platform 64 will move a much smaller distance. For example, if each lever has an input arm to output arm ratio of 4:1, then the platform will move $\frac{1}{4}^3$ or 1/64 of the distance moved by the input end of the first lever. Thus, if the stops are set to allow the input end of the first lever to move a distance of 0.010 inch, then the platform will move approximately 0.000156 inch which is about 4μ, the distance needed for the dithering movement as set forth above.

In order to be inexpensive to manufacture, the three levers with fulcrums and interconnections between levers can be made as a dither assembly 36 of one sheet of material using photo etching technique of manufacture. As disclosed in my copending application Ser. No. 08/000325 entitled A Dithering Mechanism for a High Resolution Imaging System, and filed on even date herewith, the fulcrums for the levers 40 are formed by pairs of intersecting bars 42 and 44 whose width is reduced at the ends to permit flexure (FIG. 2). Similarly, the interconnections between the levers is accomplished with another bar 46 of similar shape. The three sets of cascaded levers 50, 52, and 54 are illustrated more closely in FIG. 2. Each of the sets include a first, or input lever 56 which is provided with a aperture 58 which accepts an input rod 60. (Shown in FIG. 1) The cascade sets 52 and 54 share an input lever 56. A pair of stops 55 are provided for the input end of each of the first levers 56 to limit the input motion which can be imparted thereto. Each of the cascade sets has an output lever 62 which is connected to a platform 64 which is provided with a central aperture 66 to accept the image sensor, not shown. One set of cascade levers 50 constrains the platform 64 in the X direction while two sets of cascade levers 52 and 54 constrain the platform in the Y direction. The use of the two sets, 52 and 54, also constrain the platform 64 against rotation about the Z axis, perpendicular to the plane of the platform.

Considering the plane of the image sensor, or CCD array, to be the X-Y plane, the CCD array is mounted so that its position is fixed in four degrees of freedom; namely Z, θx, θy, and θz. The position of the CCD array in the X and Y directions is controlled by the dither assembly 36.

As illustrated, the dither assembly 36 is mounted on a base plate 80 which is provided with an aperture 82 in alignment with the aperture in the platform 64. The base plate is also provided with actuating input rods or levers 60 which mate with apertures in the first levers 56. The input rods or levers are operated by small solenoids or cams, not shown, to provide the input to the lever cascade.

The platform 64 is supported in the X-Y plane by a plurality of wire flexures 84 which are fixed at one end to the platform and at the other end to the base plate 80. The wire flexures have a sufficiently high aspect ratio of length to diameter that they permit the platform to move in the X-Y plane without permitting the platform to move in the Z direction, along the optical path. The wire flexures must be stout enough that they will not buckle under the weight of the platform and any image sensor attached thereto, yet they must permit the small motion of the platform in the X-Y plane required for the dithering of the image sensor.

The dither assembly 36 is held on the base plate by a suitably apertured cover plate 86.

Accordingly, the present invention provides means for applying an input force to a first lever, and a stop means arranged to engage the first lever at a first and a second limit of its input displacement so that the input force applied to the first lever will produce a precise, repeatable, shift of the position of the dither platform, whereby the magnitude of the platform shift is not dependent upon the magnitude of the input force but is dependent only upon the geometry of the arrangement of levers and upon the position of the fixed stops which limit the motion of the first lever.

Moreover, the present invention provides an imaging platform support wherein the position shift can be selectively made in two directions, without affecting the location of the imaging platform or the image sensor along the optical path.

Moreover, while the invention has been described as providing for the support of the image sensor, it will be appreciated that the present invention may also be employed for providing the support of the source image which is being sensed by the image sensor, or that other portions of the optical system provided with such dithering motion can be supported with the present invention with the same advantageous effects.

The invention has been described with reference to specific preferred embodiments and variations thereof, but it will be understood that other variations and modifications can be effected within the spirit and scope of the invention, which is defined by the following claims.

I claim:

1. A means for mounting an image sensor in an optical path, the axis of said path being perpendicular to the surface of said image sensor, such that every pixel on the image sensor is rigidly positioned with respect to the direction of the optical path but is free to undergo small displacements transverse to the direction of the optical path, comprising:

a platform to which the image sensor is mounted, and at least three wire legs having sufficient rigidity that they support said image sensor without stretching or buckling, each wire leg being attached to said platform at one end and attached to a stationary base plate at the other end, said wire legs being disposed substantially parallel to the optical path whereby said platform and said image sensor are movable transversely of the optical path upon the application of a transverse force to said platform by slightly bending said wire legs without movement along the direction of the optical path.

* * * * *